United States Patent
Orpen et al.

[11] Patent Number: 5,979,146
[45] Date of Patent: Nov. 9, 1999

[54] WRAPPING METHODS AND APPARATUS

[76] Inventors: Kenneth Stephen Eddin Orpen, Jade House, Croyden Road, Westerham, Kent, United Kingdom, TN1X 1TX; Peter William Pridham, 40 Stoops Lane, Bessacarr, Doncaster, S. York, United Kingdom, DN4 7RY

[21] Appl. No.: 08/981,183
[22] PCT Filed: Jun. 17, 1996
[86] PCT No.: PCT/GB96/01458
    § 371 Date: Apr. 13, 1998
    § 102(e) Date: Apr. 13, 1998
[87] PCT Pub. No.: WO97/00202
    PCT Pub. Date: Jan. 3, 1997

[30]     Foreign Application Priority Data

Jun. 16, 1995 [GB] United Kingdom .................... 9512281

[51] Int. Cl.$^6$ ................................................... B65B 53/00
[52] U.S. Cl. ................................. 53/441; 53/556; 53/587
[58] Field of Search ........................... 53/556, 441, 587, 53/588

[56]              References Cited

U.S. PATENT DOCUMENTS

| 5,442,893 | 8/1995 | Soderberg ........................... 53/556 X |
| 5,483,785 | 1/1996 | DiCarlo .................................. 53/556 |
| 5,816,026 | 10/1998 | Orpen .................................. 53/556 X |

FOREIGN PATENT DOCUMENTS

| 242975 | 10/1987 | European Pat. Off. . |
| 2195489 | 12/1985 | United Kingdom . |
| 2275905 | 9/1994 | United Kingdom . |

*Primary Examiner*—Linda Johnson
*Attorney, Agent, or Firm*—Thomas J. Engellenner; Nutter, McClennen & Fish, LLP

[57]              ABSTRACT

An apparatus for wrapping an article, such as a bale of silage, in a stretchable polymeric film comprising a pair of stretch rollers for stretching the film, a film dispenser for delivering the film to the stretch rollers and means for rotating the article to take up stretched film from the stretch rollers. The means for driving the stretch rollers comprises at least one first hydraulic motor, and the means for rotating the article comprises at least one second hydraulic motor, and the at least one first hydraulic motor and the at least one second hydraulic motor are connected in series. The at least one second hydraulic motor is run at least partially on the exhaust from the at least one first hydraulic motor such that the ratio of outputs of the at least one first hydraulic motor and the at least one second hydraulic motor is fixed. In one embodiment, the pair of stretch rollers are nipped and geared to each other, wherein one of the nipped stretch rollers is directly driven by the second hydraulic motor at up to a 160% higher peripheral velocity than the other nipped stretch roller.

40 Claims, 4 Drawing Sheets

WRAPPING METHODS AND APPARATUS

This invention relates to methods and apparatus used in agriculture and industry for the encapsulation or wrapping of objects of cylindrical, square or rectangular block form, such as bales.

The objects can include bales of agricultural produce such as silage, hay and straw; individual items of industrial equipment, pallets loaded with goods and goods arranged together to form a bundle.

International patent application PCT/GB94/00505 in the name of Kenneth S. E. Orpen discloses a method and apparatus for the wrapping of bales with stretched film. Field trials of that invention have been successful. During the course of these trials, however, some limitations have emerged and various improvements have now been devised which are the subject of this invention and which the present application discloses.

Our development work has established that the present invention offers significant benefits over the invention taught in PCT/GB94/00505 and, importantly, greatly broadens the scope of its potential agricultural and industrial applications.

The present invention aims to provide improved methods and apparatus for wrapping or encapsulation and to reduce the consumption of wrapping film using hydraulic motors with newly conceived control systems.

In agriculture, encapsulation of bales of many compositions with extensible and partially elastic, or stretchable, polymeric film is well known. The established types of wrapping apparatus and methods used suffer many disadvantages. They include high capital cost, inconsistent stretching of the film, difficulties in controlling film tension, securing even wrapping, acceptable sealing of environmentally sensitive encapsulated items, and excessive consumption of costly film.

For wrapping bales or pallets loaded with goods, known systems often use a load-carrying device such as a table or platform on which the object(s) to be wrapped are placed.

In some systems a dispenser carrying the wrapping material is manually or mechanically moved, e.g. rotated, about the object through one or more axes while the table remains stationary. In other systems, the dispenser carrying the wrapping material is held for the most part stationary, or at a fixed location, whilst the table carrying the object is rotated.

Means commonly used to power either type of system can include manual effort, mechanical drives, electric motors and hydraulic motors, or different combinations thereof.

For simplicity hereafter objects being encapsulated will be referred to generally as bales (whether or not they are of agricultural origin) and the wrapping material will be referred to as film.

Amongst many uses the most common purpose of wrapping or encapsulating a bale is to provide a degree of protection to the contents of the bale. Extensible and partially elastic or stretchable polymeric film is the material most commonly used for this purpose.

Films used are usually clear, white, black or some other colour or combinations of colours. Films used for wrapping some perishable products, including agricultural bales of silage or hay, may include an ultra violet light inhibitor to provide enhanced protection to the encapsulated material. Some films are provided with a tack or low level of self-adhesive on one surface or on both surfaces, to improve the sealing characteristics of the layers and joints on the bale.

Polymeric film is expensive and hence for this reason there is a desire to reduce the amount of film used to wrap a bale. Moreover, polymeric film is not readily biodegradable, and once the protective wrapping is removed, it is not easily reusable, so on environmental grounds there is again a need to maximise efficiency of film usage.

This invention therefore aims to reduce significantly film usage without detriment to the effective wrapping of bales.

Film usage is likely to rise significantly through greater use in agriculture particularly for wrapping bales of silage. Currently, approximately only 30% of the UK silage crop is made in this way and the remaining 70% is still being made in environmentally hazardous outdoor clamps.

In agriculture, when wrapping a bale of silage, it is important to ensure that the encapsulation process is complete and thorough. Firstly the contents of the bale must be isolated from the atmosphere to allow the ensiling process to take place, turning the bale of raw grass into a quantity of high value long life animal feed. Secondly, seepage from the encapsulation of the contaminative, poisonous, acidic products that are produced as by-products at certain times during the ensiling process must be contained.

It will be understood, therefore, that when wrapping bales of silage it is of prime importance to ensure the best possible encapsulation of every single bale.

The present invention permits the application of film to a bale under tension, where control of tension is significantly better than has hitherto been economically attainable. Film dispensing systems, where the film is pulled from a film dispensing device, often lead to uneven levels of tension and narrowing or 'necking' of the film due to the occurrence of uncontrolled excess tension. which leads to an unsatisfactory, uneven distribution of film over the surface of the bale.

With the systems commonly in use, inadequate film tensioning is also known to happen at times. Then, the film is applied too loosely, that is, without enough tension to cause it to adhere firstly to the bale and secondly to the preceding layers resulting in an unsealed package.

As the film is wrapped around the bale, the film is tensioned or stretched to make it stay in place on the bale. The tension from the film also has the effect of holding the bale or bundle together tightly, or for example, binding and holding a bundle to a pallet. The tension is also used to create and ensure the required degree of encapsulation is achieved, to protect the bale or bundle from external damage including crushing, denting, heat from the sun, from ingress of water and to ensure a degree of air tightness is achieved. Current film wrapping systems often fail to control film tension to the extent necessary to meet the foregoing requirements.

Film tension or film stretch is commonly achieved by passing it over rollers moving at different surface speeds which may be relatively constant. In most commonly used systems, film tension is created when the film is pulled from the dispenser device, e.g. by the rotating bale being wrapped. In contrast, this invention powers the film from the dispenser thereby accurately controlling both film stretch and film tension and the rate or speed of delivery of the film to the bale.

This invention provides means to stretch film controllably to greater levels than used in wrapping bales of silage heretofore. It will be appreciated that the further a given length of film can be stretched, with reduction of its gauge and without substantial reduction of its width, the greater its coverage. It follows, therefore, that if higher percentage levels of stretch can be achieved, the consumption of film used per encapsulation will fall.

In the environment of the agricultural industry the percentage stretch has varied between 40 and 70%. It has not been safe to use higher stretch ratios because the state of the art wrapping devices, for the main part, relied on the rotating bale to stretch the film by pulling it from the film dispensing device. Attempts to use higher percentage stretch ratios have led to the film breaking prematurely, necking widthwise—resulting in poorly wrapped bales—or the bale being dislodged from the rotating turntable by the excessive reactive pull of the film on the bale.

The following description of this invention is given by way of example only.

The present invention controls two or more hydraulic motors in a series type of hydraulic circuit as will be described in detail hereafter. Unexpectedly, and surprisingly, the ensuing controlled, powered film dispensing permits greater percentages of stretch or film elongation to take place than was previously practical or safe and it also allows simultaneous accurate control of the encapsulating film tension as it is applied to the bale.

We have established that thanks to the present invention, a one tonne bale of silage can be encapsulated at a speed of table rotation of 50 rpm or more using film originally 750 mm wide stretched to in excess of 100%, e.g. 120% or more, and achieving a final width on the bale of 600 mm, safely, consistently and with full control under widely varying ambient temperatures. We have even been able to wrap bales successfully at stretch ratios as high as 160%. In contrast, using the system taught in the above-mentioned patent application, the practical maximum stretch ratio was of the order of 70%.

It will be seen that the delivery speed of the film needs to be accurately matched to that of the bale, where the system in use has a stationary film dispenser delivering film to a bale on a rotating platform or table.

Equally, in a system (also according to the invention) where the bale remains stationary while the film dispenser rotates around it, the delivery speed of the film needs to be accurately matched to the speed of the rotating or oscillating device carrying the film dispenser around the bale.

The present invention provides accurate control of film stretch, speed and tension and it can be fitted to a wider variety of both new and used machines than the device taught in the aforesaid patent application, and with minimal modification of their hydraulic circuits, so the invention is capable of enhancing and improving the performance of such machines.

The present invention allows the varied requirements briefly discussed above to be met with significantly increased accuracy resulting in lower rates of film usage and superior bale encapsulation.

The present invention is an improvement on the previous invention because the greatest part of the system load is borne by the first motor rather than the second motor, as dictated by good hydraulic engineering practice. Unexpectedly, the greatest part of the load arises from the film drive rather than the bale drive, especially when operated at a film stretch ratio exceeding 70%.

As the first motor is powering the output of stretched film, the most important element of control is taken care of in the first part of the circuit rather than the second as in the previous invention, the subject of PCT/GB94/00505.

It has been found through extensive experimentation that the apparatus according patent application PCT/GB94/0050 cannot be fitted to some machines. Such machines have the motor which rotates the table provided with a protective overload or braking device on one or both sides of it. This has reduced the scope for applying the previous apparatus simply to existing machines, and in some cases has required that complex hydraulic circuits be devised for protecting the hydraulics and the components thereof. The present invention, however, can be used either as a retro-fit on to used machines or incorporated into existing designs of new machines.

The present invention also permits the incorporation of a film advance device to power assist film delivery either by manual control, sequenced control, electrical or automatic control during that part of the operational cycle, on certain types of machines, where the bale on completion of wrapping is tipped for removal from the table or platform, commonly known as 'tipping the table'.

The present invention provides one or more hydraulic motors to drive or empower a film stretching device and couples a second one or more hydraulic motors all or in part in a series type hydraulic circuit so that the second hydraulic motor or motors are empowered wholly or in part by the flow of hydraulic oil leaving the first hydraulic motor or motors. This arrangement of the motors is surprisingly effective for accurate control of the tension of film dispensed from any form of film dispensing device used in wrapping operations. The arrangement in one practical form permits accurate control of the dispensing speed of a film dispenser device, and thus the film in relation to the bale, in systems where the film dispenser device remains for the main part in one position while the bale is rotated in one or more planes. Equally, the arrangement, in another practical form, permits accurate control of the speed of a film dispenser device, and thus the film, in relation to the bale in those systems where the film in part or in whole rotates about the bale.

Another aspect of the invention is the provision of means for manually or automatically operating the film dispensing device during the removal of the bale from the table.

In a preferred feature of the invention, all the control functions of the hydraulic elements in the present invention's series type of hydraulic circuit are combined into one machined and assembled valve block commonly known as a "polyhydron" or manifold assembly combining both Cetop valves, cartridge and other valves having manual and/or electrical types of control.

Advantageously, the invention may provide an adjustable form of hydraulic control using either a manually operated control valve or an electro-hydraulic proportional control valve to control the speed and power of a first motor(s) connected in full or in part in a series type of hydraulic circuit where such motor(s) can be used to power a film dispensing device and whereby an element of delay in a control sequence can be imparted to the first motor(s) allowing a controlled operation of a second motor(s) in the same series circuit for a short period of time prior to the first motor(s) becoming fully operational within the control of the operator or automatic control system.

Another feature of the present invention in to control one or more hydraulic motors when used in a series type of circuit for the purpose of powering and controlling a film dispensing device and a table rotating drive, by means of one or more electro-hydraulic proportional control valves.

A further feature of the present invention is to control the stretch, speed and the tension of film dispensed from a hydraulically powered film dispensing device connected in a series type of hydraulic circuit by means of one or more electro-hydraulic proportional control valves.

According to the present invention the speed of a hydraulic motor connected in a series type hydraulic circuit can be controlled with one or more electro-hydraulic proportional control valves when the motor is used to power a turntable or platform used as part of a bale wrapping device.

Preferably, one or more electro-hydraulic proportional control valves are provided to control the speed of two or more hydraulic motors connected fully or in part in a series type hydraulic circuit wherein at least one first motor is used to control the speed of a film dispensing device and at least one second is used to control the speed of a rotating arm attached to, carrying, moving or assisting a film dispensing device.

Advantageously, according to the present invention, a remote system of control such as pneumatic, electrical, infra red or radio is employed to provide a desired number of control signals to one or more electro-hydraulic proportional control valves used to control two or more hydraulic motors connected in full or in part in a series type of hydraulic circuit on a film wrapping apparatus, wherein a first hydraulic motor is used to power a film dispensing device and a second hydraulic motor is used to power a bale rotating table or a drive means provided for moving the film dispensing device about the bale.

The present invention provides apparatus for wrapping or encapsulating an object such as a bale, in any form or type of stretchable polymeric film, comprising a film dispenser with stretch roller means for stretching the film, a film feeder for delivering the film to the stretch roller means, means for driving the stretch roller means to stretch the film and means for rotating the object to take up the stretched film from the stretch roller means, wherein the means for driving said stretch roller means of the dispenser comprises a first hydraulic motor or motors connected in part or in full in a series type of hydraulic circuit with a second hydraulic motor or motors for rotating the object, whereby the second hydraulic motor or motors in use are empowered and run on all or part of the flow of oil from the first hydraulic motor or motors.

Depending on the actual design of the film dispenser, the stretch roller means can, as is known, comprise one, two or more rollers rotated at appropriate peripheral speed(s) to obtain the desired stretch ratio.

Also from this aspect of the present invention there is provided, in the alternative, apparatus for wrapping or encapsulating an object such as a bale, in any form or type of stretchable polymeric film, comprising a film dispenser with one or more stretch rollers for stretching the film, a film feeder for delivering the film to the stretch roller(s), means for rotating the stretch roller, or at least one of them, to stretch the film and drive means for moving the dispenser about the object in one or more axes, to apply a wrap of film to the object, wherein the roller rotating means comprises a first hydraulic motor or motors connected in part or in full in a series type of hydraulic circuit with a second hydraulic motor or motors forming the said drive means, whereby the second hydraulic motor or motors in use are empowered and run on all or part of the flow of oil from the first hydraulic motor or motors.

The first motor(s) may be provided with or without on-line or off-line flow control metering valves or devices. as may the second motor(s).

The second motor(s) can be connected to receive oil flowing exclusively from the exhaust of the first motor(s), or partly from said exhaust and partly from an oil feed line upstream of the first motor(s) via a preferably adjustable bleed line.

Thus in the apparatus and method of the invention, the relative speeds of the stretch roller(s) and the object being encapsulated, or in the alternative the relative speeds of the roller(s) and the dispenser itself, are accurately and simply controlled and maintained by employing a first hydraulic motor or motors to drive the film stretch roller(s) connected all or in part in a series type of hydraulic circuit with a second hydraulic motor or motors employed to drive a rotating table holding the article to be encapsulated, or driving the dispenser in its movement, with the second hydraulic motor or motors being empowered all or in part by the flow of oil from the first hydraulic motor or motors.

According to another feature of the invention, hydraulic control valves are preferably provided, arranged all or in part to control the speed of the first hydraulic motor(s) and the second hydraulic motor(s). The first hydraulic motor(s) empowers the film stretch roller(s) and the exhaust or flow from it is used wholly or in part in a series type of hydraulic circuit to empower the second hydraulic motor(s) which drive either the turntable (or other device used to rotate the object to be wrapped) or the dispenser when this is movable about the object. In the latter case, the dispenser may be mounted on a rotating carrying or supporting device or arm. As the hydraulic motors described are connected together in a series type of hydraulic circuit, at start-up it is normal to expect the first motor(s) to start running shortly before the second motor(s). However the invention preferably includes a special design of hydraulic valve block and the arrangement of the hydraulic valves in this hydraulic circuit and other devices included in the hydraulic valve block provide a short period of delay allowing the second motor(s) in the circuit downstream of the first motor(s) to start running a little before the first motor(s) and thereby prevent excess film being dispensed by the stretch roller(s) prior to the film actually being required at commencement of encapsulation.

According to another feature of the present invention all or many of the hydraulic control valves required to operate any or all the functions of a wrapping machine are contained in a unitary block variously known as a polyhydron or manifold valve block assembly. A manifold valve block assembly may include any number of Cetop valves, cartridge valves, spool valves and lever valves in a variety of positions any of which may be operated by hand, by lever, by cam or roller, by pneumatic, by oil pilot or electrical current or by electro-hydraulic proportional control. The purpose of such a manifold valve block assembly is to combine any or all the controlling functions for a wrapping machine into one assembly reducing the cost of a hydraulic installation and importantly reducing the opportunity for leaks of oil from multiple valve block assemblies.

A manifold valve block assembly such as described in the foregoing paragraph incorporating Cetop, cartridge, spool, slice, stackable or other type of electro-hydraulic proportional control valves to regulate all or in part the speed of a first hydraulic motor, e.g. for empowering one or more stretch rollers of a stretching device, and other motors in a series type of hydraulic circuit, e.g. for fitting to a wrapping machine, is thought to be novel in itself, and offers markedly superior levels of control to other types of control systems.

According to another feature of the present invention, provision is made to enable the intermittent operation of a first hydraulic motor to power the roller(s) of a film stretching device connected all or in part in a series type of hydraulic circuit to another motor or motors downstream. This feature is intended to be included in hydraulic circuits installed on wrapping machines where high percentage levels of film stretch are required or to be expected. The purpose of this is to enable a quantity of film to be powered from the film stretch roller(s) on demand as may be needed at a certain stage or stages of the wrapping operation. Such dispensing of the film can be controlled manually, mechanically or electrically or by other control signals. The hydraulic circuit designed to fulfil this function in one application uses oil jointly with a hydraulic actuator, or cylinder, used to tip the table of the machine at the point in the operational cycle when the completed encapsulated bale or bundle is tipped or removed from the table. In another application the hydraulic circuit to fulfil this part of the present invention uses oil available in a manifold valve block assembly. The return oil flow from a first motor installed and used in the aforesaid manner according to the present invention in this instance does not pass to a second or other motor downstream of the first in a series type of hydraulic circuit but is routed via a check valve into the return from the retractive side of a cylinder that is used to tip the table on certain types of wrapping machines. This is another novel aspect of the present invention which is of considerable hydraulic importance in the hydraulic circuit of certain types of wrapping machines where other hydraulic cylinder or actuator functions are linked in series or parallel types of hydraulic circuit to the table tipping cylinder, because as will be seen from examples of hydraulic circuits disclosed in more detail hereafter, the normal operating rotative function as is applicable also ensures an open circuit connection to the retractive side of the table tipping cylinder and any other cylinders or actuators connected to it throughout the rotative part of the encapsulation cycle causing them to be held in position and positively preventing them from accidentally coming into contact with any rotating or moving part of the machine.

Another feature of the present invention allows for remote forms of control such as electrical, oil pilot, pneumatic, radio and infra red controls to operate all or any of the hydraulic control valves by any means on or incorporated into the hydraulic circuit or circuits of a wrapping machine where a first hydraulic motor or motors empowers the roller, or at least one of the rollers, of a film stretching device and a second or more hydraulic motors are connected wholly or in part in a series type of hydraulic circuit downstream of the first motor or motors whereby the second hydraulic motor or motors are empowered by all or part of the return or exhaust oil flow from a first hydraulic motor or motors.

A further development of the present invention makes possible controlled reversing of a second hydraulic motor or motors, connected wholly or partly in a series type of hydraulic circuit with a first hydraulic motor or motors, such as may be used to empower one or more rollers of a film stretch device, without simultaneously operating the first hydraulic motor or motors. The means used to achieve such a reversal an described is a combination of hydraulic valves and control devices assembled either in one composite manifold block valve assembly as heretofore described or in a separate manifold block comprising such elements as are required to achieve the desired reversal.

In such a manifold block as referred to in the previous paragraph, control devices to achieve separate reversal of the second hydraulic motor or motors can also include flow control valves and devices to regulate the speed of the first motor or motors and any delay functions as described before. Still further, if desired, the block can include hydraulic control valves and other devices to provide controlled intermittent film dispensing from stretch roller(s) empowered by a first hydraulic motor or motors as described heretofore. Such a manifold block may be mounted in any convenient location in a wrapping machine. Control of the system can be manual, mechanical, electrical or by remote means such as radio or infra red controls as required or desired.

In a further aspect of the present invention, one or more film stretch rollers and a rotative device such as a turntable or a film dispenser drive forming part of or incorporated in a wrapping machine can both be empowered by hydraulic motors driven by hydraulic oil from one common source. The flows of oil needed to achieve the correct relative speeds of each part of the system are manually, mechanically, hydraulically or electrically separated into the respective constituent volumes necessary to achieve and maintain the relative speeds that are required to properly wrap the object, without restriction as to the means employed for separating and controlling the flows. In addition a further aspect of the present invention is that such a system as described heretofore using separate flows of oil to empower hydraulic motors to power different parts of a wrapping machine can also be effected by using two or more separate hydraulic pumps, a constant pressure variable flow hydraulic circuit or a load sensing hydraulic circuit.

Specific embodiments of the present invention will now be described in more detail by way example with reference to the accompanying drawings, in which.

The envisaged use for the circuits illustrated herein is in apparatus for wrapping a bale using a film drive motor and a bale driving (e.g. turntable) motor. However, it is to be understood that apparatuses embodying any of these circuits are not limited to wrapping bales of agricultural material, but are applicable for wrapping other objects as noted earlier in this specification.

Figure 1:
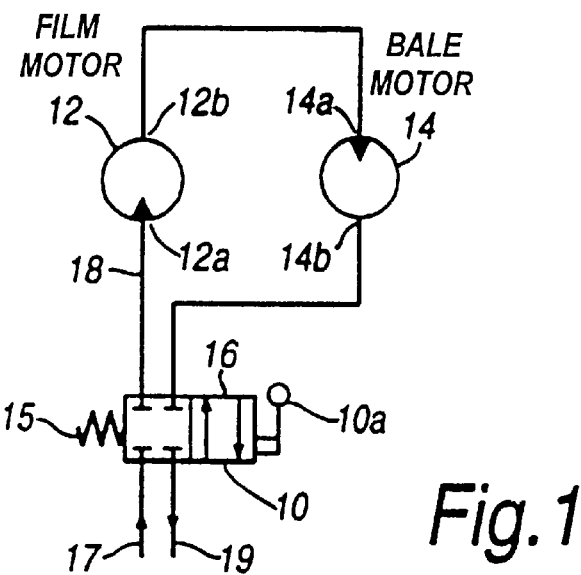
FIG. 1 shows a first hydraulic circuit for a wrapping machine.

FIG. 1 shows a simple mono-directional circuit allowing one source of hydraulic oil to operate two motors 12, 14 connected in series, the motors not being reversible. 12 is the film drive motor and 14 is the turntable motor. Valve 10 is used to operate the circuit illustrated in FIG. 1. Valve lever 10a is actuated against spring 15 to select a valve configuration whereby a valve operator or spool 16 allows hydraulic oil under pressure from a source and feed line 17 to traverse valve 10. Oil flows through valve 10 and along line 18 into the inlet port 12a of film drive motor 12 causing motor 12 to revolve. The film drive motor 12 and table drive motor 14 are connected in series, and exhaust oil from motor 12 exits outlet port 12b and passes into inlet port 14a of the table drive motor 14 causing it to revolve. The exhaust oil from motor 14 passes from outlet port 14b and returns to valve 10 and thence along line 19 back to the source. The circuit stays operational until lever 10a is released, whereupon spring 15 returns valve 10 to a closed position.

Figure 2:
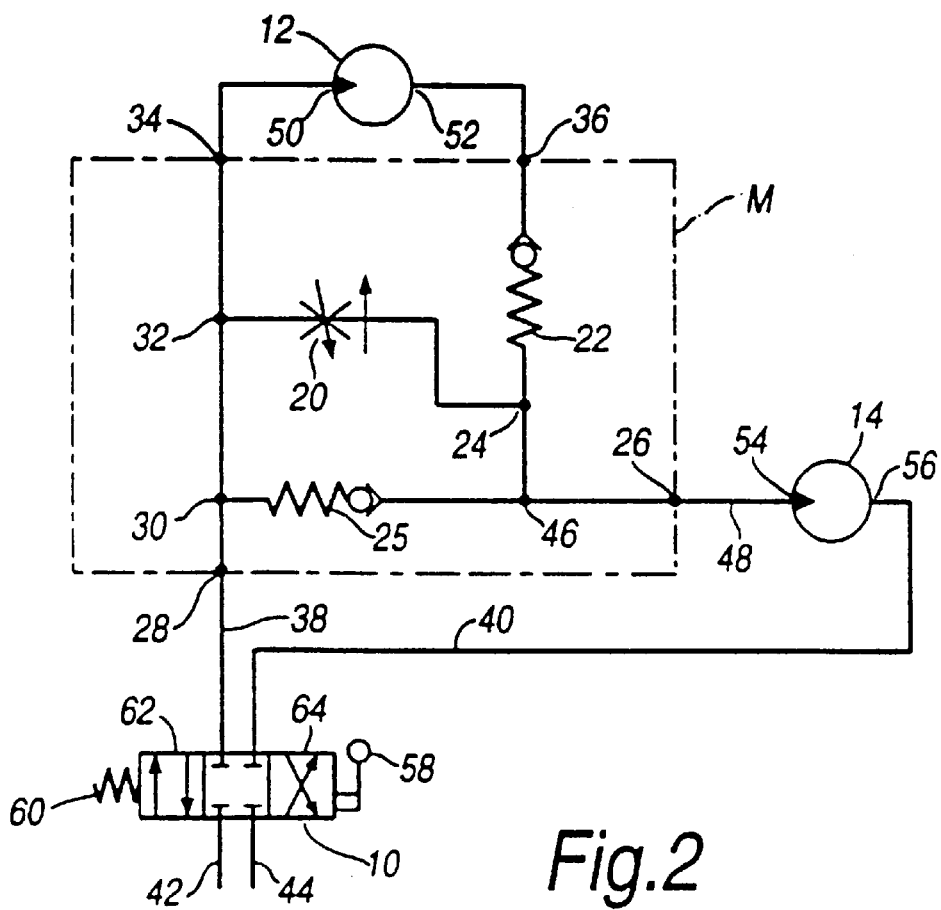
FIG. 2 shows a second hydraulic circuit for a wrapping machine, which enables one motor to be reversed without affecting the other.

Developed from FIG. 1, FIG. 2 shows a partly bi-directional circuit which allows one source of hydraulic oil to be used to control two motors connected in series with one motor being reversible without reversing the other motor. The circuit design also allows the speed of one motor to be varied independently of the other. It should be noted that the hydraulic sequence described below takes place in a little over two seconds.

To operate the circuit illustrated in FIG. 2, valve control lever 56 is pulled to the right against spring 60. This selects valve spool configuration 62 to allow hydraulic oil under pressure to flow from a source along line 42, through valve 10 and along line 38 to a manifold block M which it enters at port 28. Oil then passes junction 30. It cannot escape via check valve 25 but proceeds from junction 30 to junction 32.

At junction 32, some oil fills the line leading to off-line flow control valve 20, and depending on its setting, a smaller or larger amount passes the valve and flows to junction 24. Simultaneously, oil from junction 32 flows out of manifold block M through outlet port 34 into film drive motor 12 via its inlet port 50. System pressure now builds between port 28, off-line flow control 20 and film drive motor 12; as the external load on motor 12 is greater than the pressure available in the line at this point in time, oil takes the route of least resistance which is through valve 20 to junction 24, on to junction 46, out of manifold block M via port 26 along line 48 to table drive motor 14 via its inlet port 54.

Initially, the load is greater on motor 12 than motor 14 which causes motor 14 to begin revolving first, rotating the table or other device connected to it. As there is a mechanical connection between motors 12 and 14 by way of wrapping film, motor 14 as it begins to revolve, in effect starts to assist motor 12 but in any case starts before it.

The pressure between port 28, valve 20 and motor 12 now builds rapidly causing motor 12 to rotate whereupon oil from the motor 12 exits its outlet port 52 and flows into manifold block M at port 36, passes over check valve 22 and joins with such oil as is still passing through valve 20 at junction 24. The combined flow of oil then passes to junction 46. It cannot pass check valve 25 because the oil pressure in the line on the junction 30 side of valve 25 is greater than that in the line on junction 46 side of valve 25.

The combined flows of oil now proceed out of manifold M at port 26 along line 48 to inlet port 54 of motor 14, causing it to increase in speed. Oil exhausts from motor 14 at port 56 and flows along line 40 to control valve 10, passing through it and along line 44 back to source.

The control circuits and flows are now established and any increase in flow along line 42 through control valve 10 will result in motors 12 and 14 increasing in speed together; conversely any decrease in flow along line 42 will have the effect of slowing both motors together.

The speed of motor 12 relative to motor 14 can now be adjusted or varied as required by enlarging or reducing the flow of oil passing through off-line flow control valve 20. Opening valve 20 and increasing the flow through it allows more oil to pass to junction 24 and hence motor 12 will slow, while reducing the flow through valve 20 allows less oil to flow through to junction 24 and thereby increases the speed of motor 12. The circuit will continue to operate so long as power is available and the control valve is held open.

The circuit of FIG. 2 permits motor reversal. With this circuit, the normal rotation of the second motor 14 can be reversed without simultaneously reversing the first motor 12.

In the sequence of operations it is considered possible that there will be a requirement to reverse the second motor without also reversing the first motor. To achieve this, valve lever 58 is pushed back against spring 60 causing valve spool configuration 64 to be selected.

Oil from the source then flows along line 42 through valve 10 and along line 40 into motor 14 via port 56. Motor 14 now rotates in the opposite direction. Oil now exhausts from motor 14 via port 54 and flows into manifold block M via port 26 to junction 46. Check valve 22 prevent flow to motor 12, and with the resistance to flow passing in the reverse direction through valve 20 being greater than the resistance of check valve 25, oil flows past check valve 25 to junction 30. At junction 30 motor 12 and off-line flow control 20 offer greater resistance than port 28 so that the path of least resistance for oil flowing in a return line situation in this manner is to flow out of the manifold block M at port 28 and thence through valve 10 to line 44 and back into the source.

It will be evident that a source of hydraulic oil under pressure flowing from a system along line 42 to feed a control valve such as valve 10 and then the subsequent system can itself be subjected to any kind of flow metering. This may take the form of a variable flow or a fixed flow that is metered, but in any such case once motors 12 and 14 are running, apart from any variation of flow control valve 20, any external metering of the inlet flow to line 42 will cause them to speed up or slow down as appropriate, in the same ratio.

An electro-hydraulic proportional control valve may perform the function of valve 10.

Figure 3:
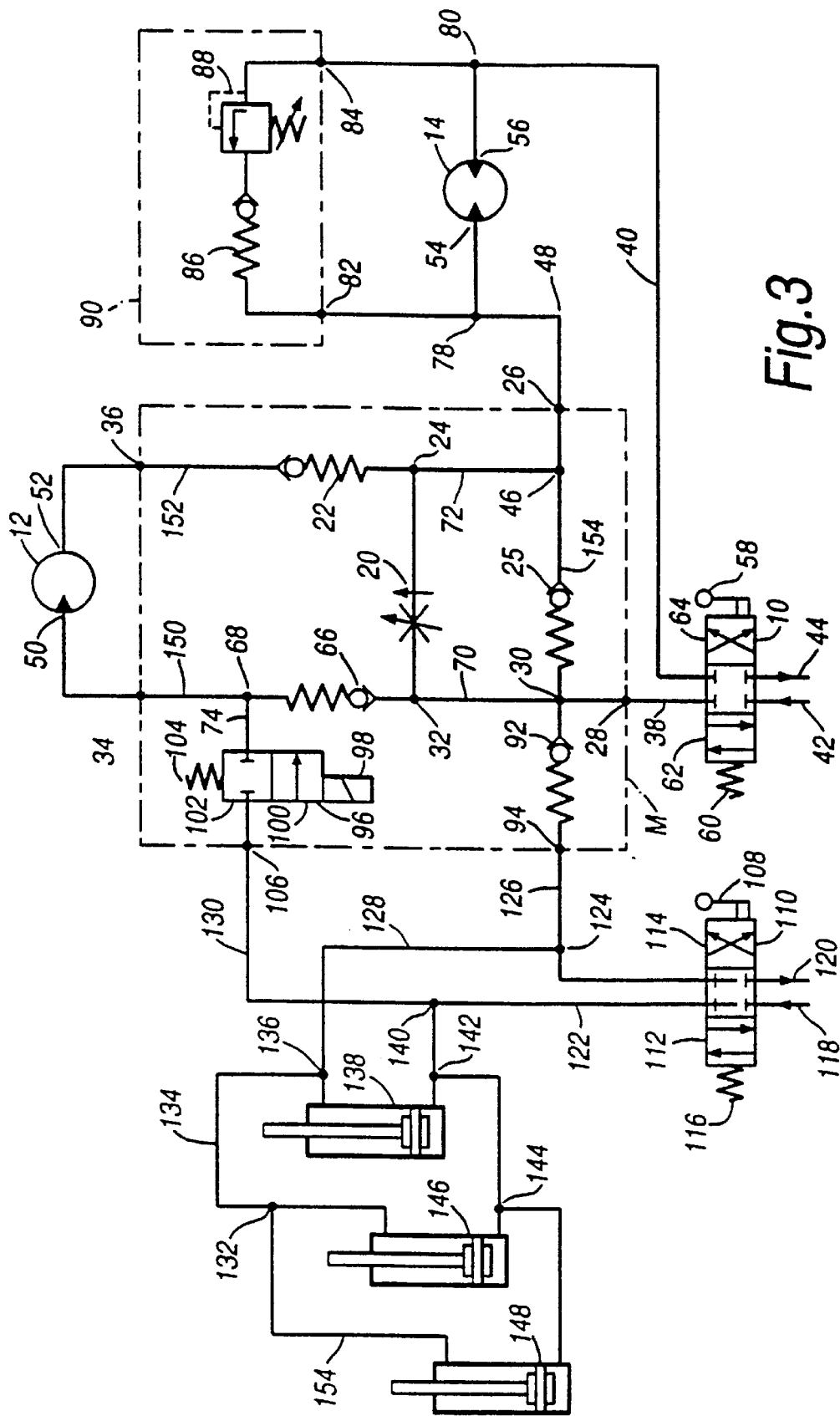
FIG. 3 shows a third hydraulic circuit for a wrapping machine, which provides additional facilities including film advance and table tipping.

Turning now to FIG. 3, this shows a bi-directional circuit similar in many respects to FIG. 2. However, this circuit has other features, including a independent film advance feature. The operational explanation provided for FIG. 2 also applies to FIG. 3, the same reference numbers applying for similar parts and components.

For motor 14 in FIG. 3 there is an extra sub-circuit 90 comprising a relief valve 66 with an in-line check valve 86 downstream of it. Sub-circuit 90 provides a relief and anti-cavitation feature to allow a fast moving motor to slow down without cavitating via junctions 84 and 82.

A more sophisticated circuit is shown in FIG. 3, to which attention is now directed.

The different operational features between FIG. 2 & FIG. 3 begin when operating in the first mode, i.e. the bale wrapping cycle. Oil flowing through port 28 into manifold M passes across junction 30, check valve 25 preventing any flow passing towards junction 46. However, if a hydraulic connection is made to manifold M to one or more hydraulic cylinders such as shown at 138, 146 & 148 and via port 94, then check valve 92 will allow oil under pressure to pass out of manifold block M, through port 94 along line 126 to junction 124.

At junction 124 the oil is unable to pass to and through a second control valve 110 because it currently is closed. When this circuit is used on a wrapping machine only one of these two control valves 10, 110 should be operatable at one time.

Control valve 10 of course operates a bale rotating device and the other control valve 110 controls tipping of the same rotating device for discharging a wrapped bale therefrom. It will be understood that valve 110 should be inoperable when valve 10 is operable and the bale is being rotated to ensure that tipping cannot then occur. If tipping and rotating were possible at the same time, on some systems could be the cause of damage to the equipment or an accident to an operator.

In some electrically controlled wrapping machines, these two functions (rotating and tipping) are protected from simultaneous operation by safety interlocks; on manually controlled machines it is left to the operator not to attempt actuating both valves at once. For the majority of known wrapping machine sequences, only one of these two functions is used at one time.

First cylinder-piston 138 will typically be used to tip a turntable. Second cylinder-piston 146 would normally be smaller and more lightly loaded than the first cylinder 138. This would ensure that the smaller cylinder-piston moves first and more quickly than the larger cylinder. On a number of machines currently in use a second cylinder or cylinders are used to actuate locks to hold a turntable still, preventing it swinging while it is tipped by the first cylinder.

In addition, a third small cylinder-piston 148 is commonly included to perform a light duty function such as gathering film at the same time as a turntable is tipped.

All three cylinder-piston devices 138, 146, 148 frequently have a common safety requirement, in that they must not move when a rotating function is taking place.

According to the present invention, hydraulic pressure is applied to all the retractive sides or annulus areas of the cylinder-pistons, thus effectively holding them all fully retracted while the rotating function takes place. This is achieved from junction 124 via line 128, junction 136, line 134, junction 132 and line 154. The significant benefit of this effect is the risk of any clash of machine functions is greatly reduced and the present invention enhances the safety of this type of machine circuit. Even when motor 14 is reversed line 126 remains lightly pressurised by the return flow of oil producing the same retractive effect.

Another difference between FIG. 2 & 3 lies downstream of junction 32. Here a check valve 66 is located in line 70 to prevent any oil flowing from junction 68 back to junction 32. The need for this extra check valve 66 arises from the anticipated use of valve 96.

Valve 96 is shown as an electrically operated two position spring return valve; it can also be operated by any of the following: cam, lever, roller, oil pilot and air. The purpose of valve 96 is to admit hydraulic oil under pressure from line 130 at any time during the turntable tipping cycle. The full bore side of cylinder 138 which is commonly used to tip a turntable on a wrapping machine, is linked by junction 140 and line 130 with manifold port 106 and thence valve 96 in the manifold M.

In this example a turntable may be tipped by pulling control lever 108 of valve 110 against spring 116 bringing valve operator or spool 112 into play. Hydraulic oil under pressure is then free to flow along line 118 through valve 110 towards cylinder 138, along line 122 to junction 140 and thence to the full bore or base aide port of cylinder-piston 138 adjacent to junction 142.

As the oil at junction 142 also has access to the bass ports of cylinder-pistons 146 and 148, the lightest loaded will extend first followed by the second lightest loaded and then in this case followed by the heaviest loaded cylinder.

When the table is tipped it is normal for the wrapped bale to roll off the table down a short ramp on to another surface adjacent to the wrapping machine. Common practice is for the film to be mechanically cut and clamped ready for the next wrapping cycle as the bale rolls off the turntable.

When the turntable starts the tipping sequence, the bale is still attached to the film. As the cutting of the film commonly takes place as the bale starts to roll off the turntable, the fact that the turntable has lifted up in the course of its tipping sequence means that the relative positions of the bale and the film dispenser have changed and the distance between the film dispenser and the bale has increased.

At this point the length of film between the film dispenser and the bale, having already been stretched, may and usually is unable to stretch much further. Accordingly, the film dispenser has to dispense some more film to prevent the tipping function snapping or breaking the aforesaid length of film. At stretch ratios of 70% the extra film will, for the most part, be drawn from the dispenser successfully by the bale. At stretch ratios of 120% and above, film will not allow itself to be drawn through the dispenser in this way, for it will snap or tear. Thus, the extra film has to be powered from the dispenser.

At any time during the tipping sequence and before any retraction of the tipping cylinder commences, valve 96 has access to oil under pressure from junction 140 via line 130 through manifold port 106. Upon receipt of a control signal or other input valve coil 98 or other valve actuator moves against spring 104 to move spool configuration 100 allowing oil to pass through the valve to junction 68.

Oil under pressure is now free to flow along line 150 to exit manifold block M at 34 and into film drive motor 12 at port 50, causing the motor to revolve and thus empowering the film dispenser to deliver film for as long as control valve lever 100 is held and/or valve 96 remains open or operative. This feature of the present invention satisfies the film advance requirements of a powered film dispenser capable of stretching film in excess of 100%.

Exhaust oil from film drive motor 12 operated as described above now passes out of motor port 52, into manifold block M at 36 and along line 152, passing check valve 22 and junction 24. Unable to pass back through valve 20, the oil flows along line 72 to junction 46; as control valve 10 is closed during this part of the cycle motor 16 is unable to revolve and remains stationary. The oil then flows along the path of least resistance, which is line 154 through check valve 25, to junction 30. Control valve 10 being shut, no oil can flow through it. The oil therefore flows through check valve 92, out through manifold port 94 and along line 126 to junction 124; as all the cylinders shown are fully extended at this point in the control sequence, the oil will take its easiest course of flow which is to return to source through control valve 110 along line 120.

As soon as valve 96 is closed the control valve lever 108 is released and pushed, to bring spool configuration 114 into play and thereby retract the cylinder-pistons 148, 146 and 138. Thanks to valve 96 being closed and check valve 92, interference with any other circuits within manifold block M in prevented during this retraction phase.

The circuit arrangements disclosed in FIGS. 1 to 3 all have the film dispenser motor upstream of the turntable motor. Bowever, the film advance, tipping and safety interlock cylinder-piston devices disclosed in FIG. 3 can equally be applied to a wrapping machine having the table motor upstream of the film dispenser motor.

Figure 4:
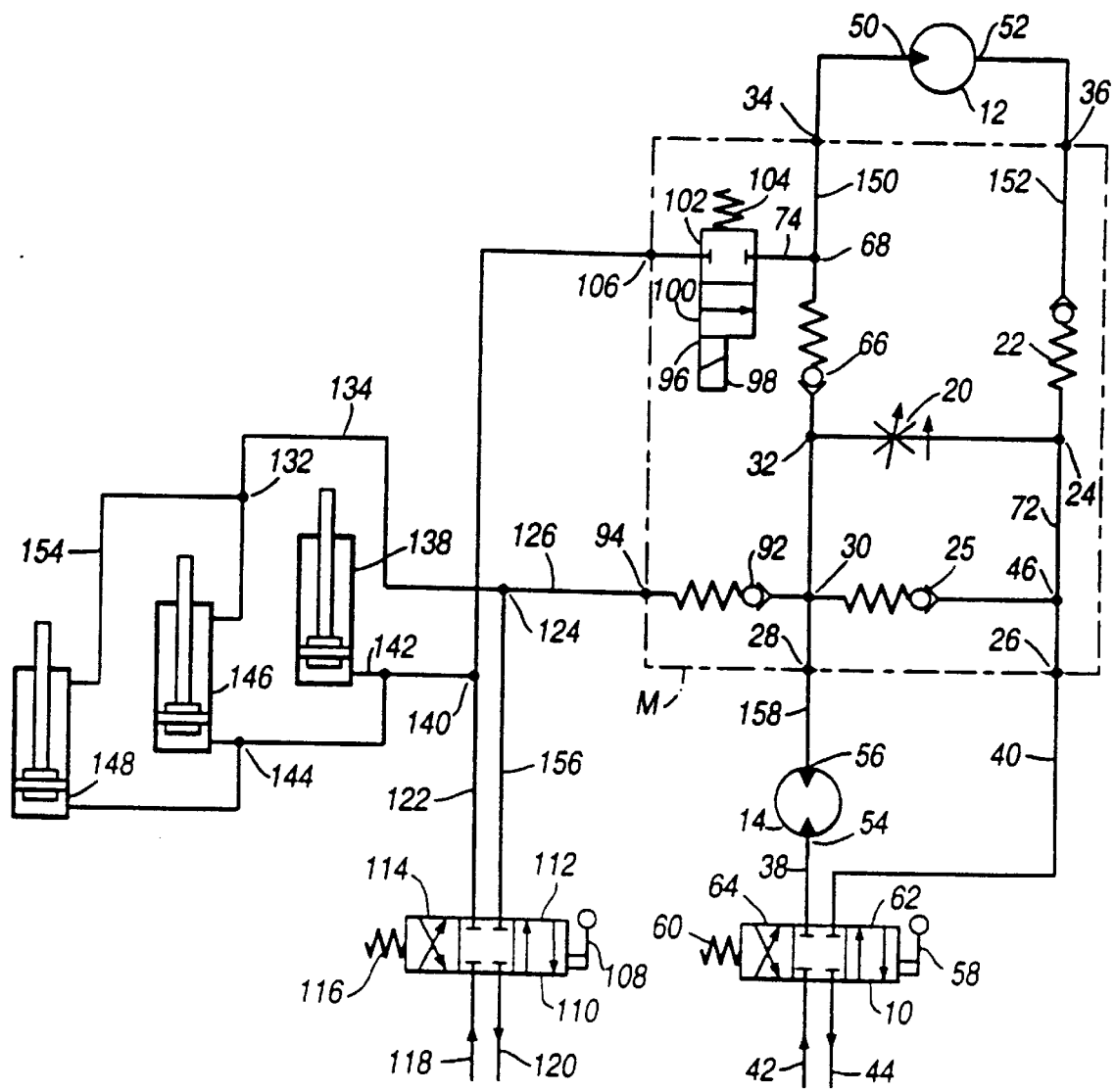
FIG. 4 shows a fourth hydraulic circuit for an alternative wrapping machine, which again provides additional facilities including film advance and table tipping.

The circuit shown in FIG. 4 illustrates the adaptation of the powered film advance feature of this invention to the invention the subject of PCT/GB94/00505, where a first motor is a table motor on a wrapping machine is located before and in a series type hydraulic circuit with a second hydraulic motor where a second hydraulic motor is a film drive motor, a second such motor being empowered by all or part of the exhaust flow from a first motor.

The operational principles and functions of manifold block M, the three cylinder-pistons 138, 146 & 148, valve 96 and check valves 66 and 92 are largely as previously described with reference to FIG. 3. When control valve 10 is operated by lever 58 spool configuration 62 is normally selected for wrapping a bale, empowering table motor 14 from line 42 via valve 10 along line 38 into motor 14 at port 54 causing it to rotate. The exhaust oil from motor 14 leaves via port 56 and flows along line 158 into manifold M via port 28.

Within manifold M the oil flows as previously described for FIG. 2 and 3 except that any surplus or balancing flow passing through valve 20 to junction 24 is combined at junction 24 with any exhaust flow coming from motor 12 which has already passed check valve 22. Unless any further motors or devices are located downstream this flow is now considered a return flow passing along line 72 and over junction 46 out of manifold M at 26 and moving along line 40 through valve 10 to line 44 and thence back to source.

The delay facility described previously which causes the film drive motor to start rotating shortly after the table motor is also created by the arrangement of valves present in the manifold M, even though it is being used in a different location, as shown in FIG. 4, and used in a different order in another series type of circuit.

Motor 14 can be reversed without moving motor 12 as described previously with oil flowing from valve 10 after selecting a spool configuration such as 64 in this case by pulling lever 58, which permits oil to flow from line 42 through valve 10 to line 40 passing into manifold M at port 26 to junction 46 where, as previously described, it takes the easiest course over check valve 25 to junction 30 and then to port 28. From there it exits and flows along line 158 to motor port 56 causing motor 14 to rotate in the opposite direction from that described in the preceding paragraphs. Oil will then exit from motor 14 at port 54, flow along line 38 and through valve 10 return into to source via line 44.

The film advance feature will operate exactly as described for FIG. 3. Again, for safety reasons, control valves 10 and 110 would not normally ever be operated together, and the important benefit of any cylinder-piston devices connected as shown in FIG. 4 is, that as before, all will be held fully retracted or closed by the line pressure present in line 126 when a wrapping sequence is taking place using motors 14 and 12. Furthermore, the same effect is present even when a table motor such as motor 14 is reversed.

Motor 14 has been consistently described as a table motor for rotating the bale or object being wrapped. In the case of a wrapping machine in which the bale or object is stationary, motor 14 will drive the film dispenser itself around the bale or object to accomplish the wrapping operation as the other motor 12 dispenses the film.

Another feature of the present invention enables closed loop position control and closed loop angular speed control of a hydraulic motor or motors in whatever hydraulic circuit is used in a wrapping machine by utilising feedback signals from one or more analogue or digital rotary position sensors forming part of an electrical or electronic control system for a wrapping machine.

As mentioned in the preceding paragraph closed loop position control is achieved by utilising electric or electronic feedback signals from one or more analogue or digital rotary position sensors. This enables a control system accurately to monitor the position of a film drive motor, a wrapper table motor or a motor used to drive a film dispenser about the bale. Additionally, as also mentioned in the preceding paragraph, closed loop angular speed control of a hydraulic motor or motors can be achieved by utilising electric or electronic feedback signals from one or more analogue or digital rotary position sensors which enables a control system accurately to monitor, control and vary the speed of a motor or motors jointly or severally in the hydraulic circuit of a wrapping machine, whether the bale is rotated or the film dispenser is driven about the bale.

This additional development enables both a turntable or a film carrying arm device to be very accurately positioned, for example using the closed loop position and speed control just mentioned. A bale or arm can be started from a known position, progressively accelerated to a fixed or variable speed and held at a given speed for a prescribed, pre-set or any number of rotations while automatically being compensated through a control system for small variations in input flows and pressures of hydraulic oil. At a given point in a control sequence the closed loop position control will initiate a deceleration procedure causing the rotating table or arm to stop at a previously designated point. Where the wrapping machine has a rotating table, then after the table has tipped as described earlier, if required the table can be caused automatically to index around to face a loading arm device for receiving a fresh bale therefrom, and to stop by means of the closed loop control in a precisely chosen position relative to the loading arm device.

A further benefit of using a closed loop speed control lies in its application to the power pre-stretch systems referred to hereinbefore, where two or more hydraulic motors are arranged in a series type of hydraulic circuit with a first motor(s) for empowering film stretch roller(s) and a second motor(s) for empowering either a turntable or a rotating arm carrying a film dispenser. Any two or more motors arranged in such a way can be very accurately controlled each in relation to the other(s). By this means, the film stretch ratio is capable of being controllably varied or held within close tolerances.

Alternatively, the same benefits of very accurate closed loop position control and closed loop angular speed control achieved by utilising electric or electronic feedback signals will accrue where said first hydraulic motor(s) drive the turntable and said second hydraulic motor(s) drive the film stretch roller(s).

Moreover, the same benefits of closed loop position control and closed loop angular speed control will apply to wrapping machines where the film dispenser is not empowered directly or indirectly by a hydraulic motor, and hydraulic or mechanical power is used to drive the turntable or a rotating arm carrying a film dispenser.

Figure 5:
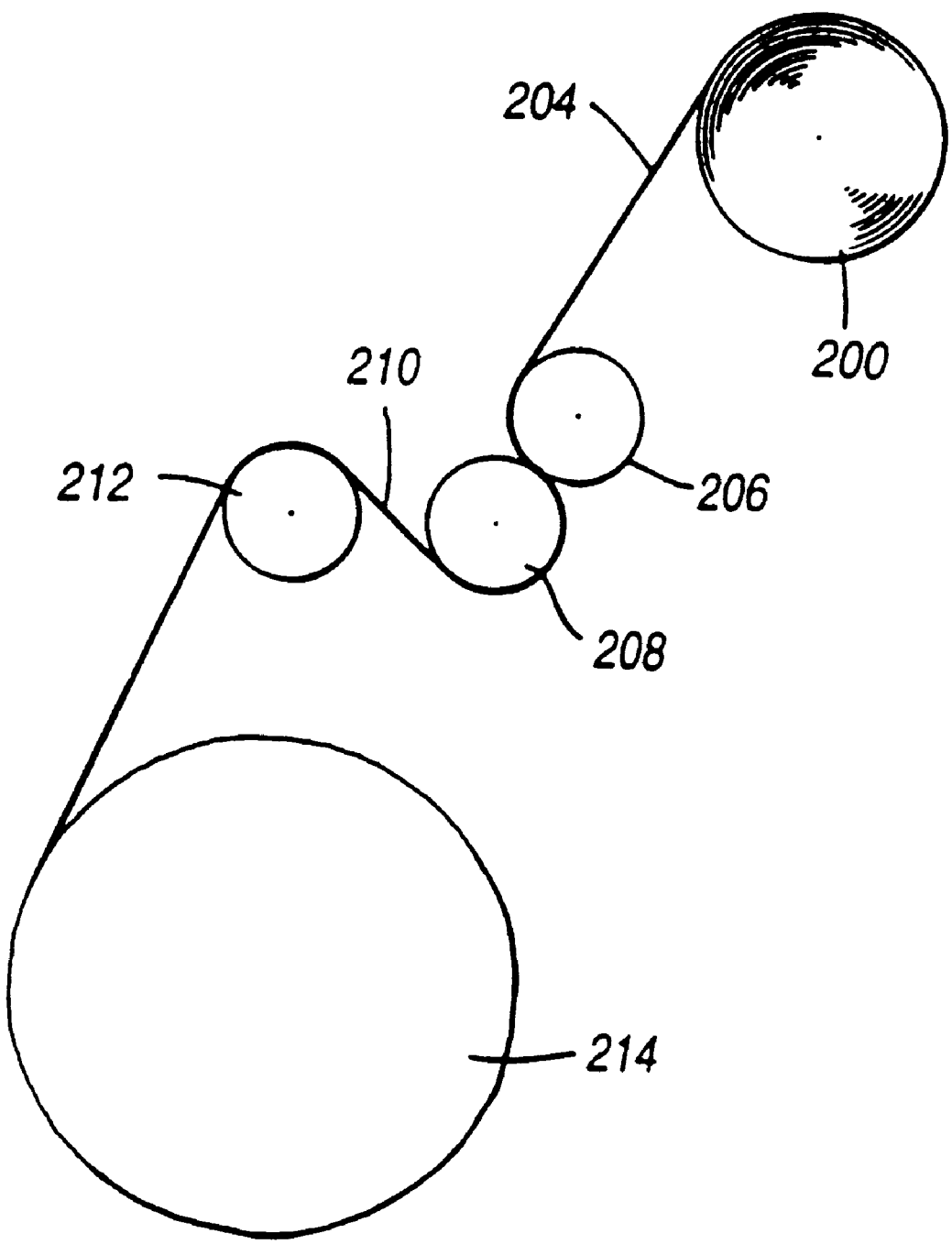
FIG. 5 shows the general arrangement of the apparatus of the present invention.

Accompanying drawing FIG. 5 shows the general arrangement of the apparatus. In this figure, 200 is the dispenser which dispenses film 204 from a roll thereof. 206, 208 and 212 comprise rollers of a film feeder, of which rollers 208 and 212 constitute stretch roller means, the latter (212) being rotated at a higher peripheral speed than the former (208) to stretch the film 210 therebetween. The ensuring stretched film 210 is used to wrap the object shown as bale 214.

Industrial Applicability

The invention is applicable to the wrapping of objects with a stretched wrapping film, more particularly to the wrapping of agricultural products. The invention is especially suited for the wrapping of bundles of silage.

We claim:

1. An apparatus for wrapping an object in film, comprising:

a film dispenser with stretch roller means, for stretching the film;

a film feeder for delivering the film to the stretch roller means;

driving means for driving the stretch roller means to stretch the film; and rotation means for rotating the object to take up stretched film from the stretch roller means, wherein the driving means for driving said stretch roller means of the dispenser comprises at least one first hydraulic motor connected in a series type of hydraulic circuit with at least one second hydraulic motor for rotating the object, whereby the at least one second hydraulic motor is adapted to run during wrapping at least partially on fluid flow from the at least one first hydraulic motor such that a desired ratio of each of the outputs of the at least one first hydraulic motor and the at least one second hydraulic motor can be maintained.

2. The apparatus of claim 1, wherein the stretch roller means comprise at least two rollers, each rotated at a peripheral speed sufficient to obtain a desired stretch ratio for the film.

3. An apparatus for wrapping an object in film, comprising;
a film dispenser with at least one stretch roller for stretching the film;
a film feeder for delivering the film to the at least one stretch roller;
rotation means for rotating the at least one stretch roller to stretch the film; and
drive means for moving the dispenser about the object in at least one axis, so as to apply a wrap of the film to the object,
wherein the rotation means for rotating the at least one stretch roller comprises at least one first hydraulic motor connected in a series type of hydraulic circuit with at least one second hydraulic motor to form the drive means,
whereby the at least one second hydraulic motor is adapted to run during wrapping at least partially on fluid flow from the at least one first hydraulic motor such that a desired ratio of each of the outputs of the at least one first hydraulic motor and the at least one second hydraulic motor can be maintained.

4. The apparatus of claim 3, wherein at least one of the at least one first hydraulic motor is provided with an on-line flow control metering device.

5. The apparatus of claim 3, wherein the at least one second hydraulic motor is adapted to receive fluid exclusively from exhaust of the at least one first hydraulic motor via an adjustable bleed line.

6. The apparatus of claim 3, wherein the at least one stretch roller comprises two nipped rollers, one of the nipped rollers being directly driven by the at least one second hydraulic motor and being geared to the other of the nipped rollers.

7. The apparatus of claim 6, wherein the one of the nipped rollers is driven at at least a 55% higher peripheral velocity than the other of the nipped rollers.

8. The apparatus of claim 3, further including a first hydraulic control means to effect reversal of each of the at least one second hydraulic motor.

9. The apparatus of claim 3, further including a second hydraulic control means for regulating the speed of each of the at least one first hydraulic motor.

10. The apparatus of claim 3, wherein the object to be wrapped is a bale of silage.

11. A method of wrapping an article in film, comprising:
feeding the film from a dispenser to the article via a pair of stretch rollers driven by at least one first hydraulic motor while rotating the article by means of the at least one first hydraulic motor; and
driving the pair of stretch rollers by means of at least one second hydraulic motor connected in series to the at least one first hydraulic motor,
whereby the at least one second hydraulic motor is adapted to run during wrapping at least partially on exhaust from the at least one first hydraulic motor such that a desired ratio of each of the outputs of the at least one first hydraulic motor and the at least one second hydraulic motor can be maintained.

12. A method of wrapping an article in film, comprising:
feeding the film from a dispenser to the article via a pair of stretch rollers;
moving the dispenser about the article in at least one axis;
driving the pair of stretch rollers by means of at least one first hydraulic motor; and
driving the dispenser by means of at least one second hydraulic motor,
wherein the at least one first hydraulic motor and the at least one second hydraulic motor are connected in series, and
whereby the at least one second hydraulic motor is adapted to run during wrapping at least partially on exhaust from the at least one first hydraulic motor such that a desired ratio of the outputs of each of the at least one first hydraulic motor and the at least one second hydraulic motor can be maintained.

13. The method of claim 12, wherein each of the pair of stretch rollers is nipped, at least one of the pair of nipped stretch rollers being directly driven by the second hydraulic motor means, the pair of stretch rollers being geared to each other.

14. The method of claim 13 wherein the at least one of the pair of nipped stretch rollers is driven at at least a 55% higher peripheral velocity than the other of the pair of nipped stretch rollers.

15. The method of claim 12, wherein the article is a bale of silage.

16. The apparatus of claim 1, wherein at least one of the at least one first hydraulic motor is provided with an on-line flow control metering device.

17. The apparatus of claim 1, wherein at least one of the at least one second hydraulic motor is provided with an on-line flow control metering device.

18. The apparatus of claim 1, wherein at least one of the at least one first hydraulic motor is provided with an off-line flow control metering device.

19. The apparatus of claim 1, wherein at least one of the at least one second hydraulic motor is provided with an off-line flow control metering device.

20. The apparatus of claim 1, wherein the at least one second hydraulic motor is adapted to receive fluid exclusively from exhaust of the at least one first hydraulic motor via an adjustable bleed line.

21. The apparatus of claim 1, wherein the stretch roller means comprises two nipped rollers, one of the nipped rollers being directly driven by the at least one second hydraulic motor and being geared to the other of the nipped rollers.

22. The apparatus of claim 21, wherein the nipped rollers are driven at substantially the same peripheral velocity.

23. The apparatus of claim 21, wherein the one of the nipped rollers is driven at at least a 55% higher peripheral velocity that the other of the nipped rollers.

24. The apparatus of claim 1, further including a first hydraulic control means to effect reversal of each of the at least one second hydraulic motor.

25. The apparatus of claim 1, further including a second hydraulic control means for regulating the speed of each of the at least one first hydraulic motor.

26. The apparatus of claim 1, wherein the object to be wrapped is a bale of silage.

27. The apparatus of claim 3, wherein at least one of the at least one second hydraulic motor is provided with an on-line flow control metering device.

28. The apparatus of claim 3, wherein at least one of the at least one first hydraulic motor is provided with an off-line flow control metering device.

29. The apparatus of claim 3, wherein at least one of the at least one second hydraulic motor is provided with an off-line flow control metering device.

30. The apparatus of claim 3, wherein the at least one second hydraulic motor is adapted to receive at least some fluid from exhaust of the at least one first hydraulic motor, and at least some fluid from a feed line upstream from the at least one first hydraulic motor.

31. The apparatus of claim 6, wherein the nipped rollers are driven at substantially the same peripheral velocity.

32. The method of claim 11, wherein one of the at least two hydraulic motors is run at least partially on the exhaust from another of the at least two hydraulic motors.

33. The method of claim 11, wherein the ratio of the outputs of each of the at least two hydraulic motors is substantially fixed.

34. The method of claim 11, wherein each of the pair of stretch rollers is nipped, at least one of the pair of stretch rollers being directly driven by the second hydraulic motor means, the pair of stretch rollers being geared to each other.

35. The method of claim 34, wherein the nipped rollers are driven at substantially the same peripheral velocity.

36. The method of claim 34 wherein the at least one of the pair of stretch rollers is nipped and is geared to the other of the pair of stretch rollers such that the other of the pair of stretch rollers is driven at at least a 55% peripheral velocity.

37. The method of claim 11, wherein the article is a bale of silage.

38. The method of claim 12, wherein the first hydraulic motor means runs at least partially on the exhaust from the second motor means.

39. The method of claim 12, wherein the ratio of the outputs of each of the first and second hydraulic motors means is fixed.

40. The method of claim 13, wherein the nipped rollers are driven at substantially the same peripheral velocity.

* * * * *